United States Patent [19]

Lange

[11] 4,113,706

[45] Sep. 12, 1978

[54] AROMATIC IMINO ACIDS AND RESINS DERIVED THEREFROM

[75] Inventor: Daniel J. Lange, St. Louis, Mo.

[73] Assignee: The P. D. George Company, St. Louis, Mo.

[21] Appl. No.: 823,732

[22] Filed: Aug. 11, 1977

Related U.S. Application Data

[63] Continuation-in-part of Ser. No. 676,550, Apr. 12, 1976, Pat. No. 4,069,209.

[51] Int. Cl.² .................... C08G 63/68; C08G 69/44
[52] U.S. Cl. ............................... 528/289; 260/18 R
[58] Field of Search ............. 260/75 N, 78 A, 47 CB, 260/47 CP

[56] References Cited

U.S. PATENT DOCUMENTS

| | | | |
|---|---|---|---|
| 3,461,136 | 8/1969 | Pruckmayr et al. | 260/326 |
| 3,567,685 | 3/1971 | Bialous et al. | 260/47 CZ |
| 3,793,250 | 2/1974 | Schmidt et al. | 260/75 N |
| 3,865,785 | 2/1975 | Pauze | 260/75 N |
| 3,929,714 | 12/1975 | Schmidt et al. | 260/33.4 P |

*Primary Examiner*—Lucille M. Phynes
*Attorney, Agent, or Firm*—Sidney B. Ring; Hyman F. Glass

[57] ABSTRACT

This invention relates to imino dicarboxylic acids (IDA) of the general formulae

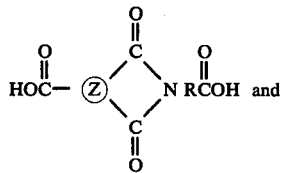

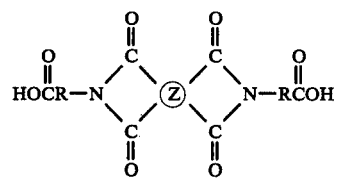

where Ⓩ is a moiety, preferably aromatic, R is a moiety, preferably aliphatic, and to resins derived from such acids. Such resins, which may vary widely, are illustrated by polyesters, poly(ester-amides), poly(ester-imides), poly(ester-imide-amides), etc. In the preferred embodiment such resins contain tris (hydroxyethyl) isocyanurate. The preferred IDA, which is derived from trimellitic anhydride (TMA) and glycine, has the following idealized formula

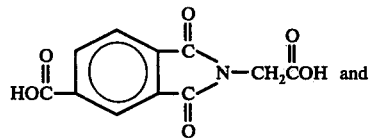

is the predominant dicarboxylic acid employed in such resins.

This invention also relates to aromatic IDA where R is aryl as illustrated by IDA derived from aminobenzoic acid and resins prepared therefrom.

11 Claims, No Drawings

AROMATIC IMINO ACIDS AND RESINS DERIVED THEREFROM

This application is a continuation-in-part of my copending application Ser. No. 676,550 filed Apr. 12, 1976 now U.S. Pat. No. 4,069,209.

Synthetic resins suitable for use as electrical insulation materials, particularly materials which are satisfactory for use as slot insulation in dynamoelectric machines and for use as insulation for conductors which are to be employed as magnet wires (insulated electrical conductors) in electrical apparatus must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enambled wire in their operation. After the coils are wound, it is common practice to coat them with a varnish solution containing solvents such as ketones, alcohols, aliphatic and aromatic hydrocarbons, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact there may be a large potential gradient between adjacent turns, it is necessary that the resin employed as wire enamels have a high dielectric strength to prevent short circuiting between adjacent coated wires. In the operation of electrical apparatus containing coiled wires, high temperatures are often encountered and the enamels must be able to withstand these high temperatures as well as the mechanical stresses and vibrations encountered in electrical apparatus so that the enamel coating does not soften, crack, or come off the wire.

Heretofore, a wide variety of resins have been prepared from dicarboxylic acids such as phthalic acids. For example polyesters have been prepared from phthalic acids, glycols, polyols, etc.; and poly(esterimides), poly(ester-amides), poly(ester-imide-amides), etc., have been prepared from phthalic acids, glycols, polyols, in conjunction with TMA and polyamines.

I have prepared resins from IDA having excellent mechanical, chemical, electrical and thermal properties which are adaptable for use as insulation for electrical conductors, such as for the use as magnet wire insulation, as slot insulation in electrical apparatus, etc.

I have prepared polyester resins from (1) polycarboxylic acids, esters, etc., (2) glycols and (3) polyols, wherein (1) is replaced in whole or in part by IDA.

Furthermore, I have prepared polyester resins containing IDA which may be cured or crosslinked with curing or cross-linking agents, such as, for example, polyisocyanates including the blocked isocyanates of the Mondur type (Mobay Chem. Co.), triazine resins, phenol-aldehyde resins, etc.

I have also prepared poly(ester-amides), poly(ester-amide-imides), poly(ester-imides), etc., where the polycarboxylic acids, esters, etc., are replaced in whole or part by IDA. These resins may also be cured or crosslinked.

I have also prepared resins containing IDA prepared with fatty acids and/or oils, for example, of long, medium and short oil content where the polycarboxylic acids are replaced in whole or part by IDA.

Thus, the invention includes but is not limited to the following:
(1) Resins which contain IDA.
(2) The cured product of (1).
(3) Resins containing IDA which are modified with conventional curing or modifying agents, with or without metal catalysts.
(4) Resins containing IDA prepared with oils.

This invention includes the use of these resins in surface coatings, laminates, films, electrical insulators, especially as wire enamels, such as electrical insulators for insulating magnet wire, as slot insulation in dyanamoelectric machines; and the use of these resins which have been "overcoated" with suitable materials.

The resins of this invention when cured on an electrical conductor provide excellent insulation.

I have discovered useful dicarboxylic acids containing imino groups which can be employed in preparing resins which in a specific embodiment is illustrated by the following formula:

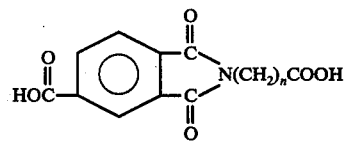

where $n = 1-5$, but preferably 1

These acids can be prepared prior to resin formation or can be added to the resin mixture during processing and prepared in situ. In general, the dicarboxylic acid is prepared by reacting substantially equimolar amounts of TMA and glycine or other polycarboxylic acids and amino acids.

The IDA can be employed to replace all or part of the dicarboxylic acids employed in preparing resins. For example, where resins heretofore prepared have employed phthalic acids as the sole dicarboxylic acid, the phthalic acid can be replaced in whole or part by IDA. Thus, the IDA can comprise from about 0.5 to 100 mole % of the dicarboxylic acid employed in the formulation, for example from about 1 to 95 mole % such as from about 5-75%, about 10-75%, about 20-50%, etc. The optimum amount of IDA employed will depend on many factors such as the particular formulation, the particular properties desired, the particular use, etc. In the preferred embodiment the dicarboxylic component is predominantly or completely IDA, i.e., about 90-100 mole % such as about 95-100%, but preferably about 100%.

Provided the final resin contains IDA, a wide variety of polycarboxylic acids, glycols and polyols can be employed.

A wide variety of amino acids can be employed in the preparation of IDA. These include aliphatic amino acids, cycloaliphatic amino acids, aromatic amino acids, etc. For example, amino acids of the formula

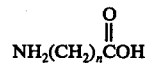

where $n=1-10$ for example glycine, amino valeric, amino caproic, β-alanine, etc.; aromatic aminocarboxylic acids such as aminobenzoic acids, such as meta- and para-aminobenzoic acids, amino naphthoic acids, 4- amino-4-carboxyl diphenyl-ether, etc. The preferred amino acid is glycine.

In addition to aminoacids, derivatives of aminoacids can be employed such as esters, etc., thereof. Thus, the esters of IDA can be employed in preparing resins in a manner analogous to the use of phthalate esters, etc. for example, alkyl or phenyl, etc., esters.

In addition to imino acids formed from tricarboxylic acids such as TMA, imino acids can also be formed from tetracarboxylic acids as illustrated by pyromellitic acid as illustrated by the formula

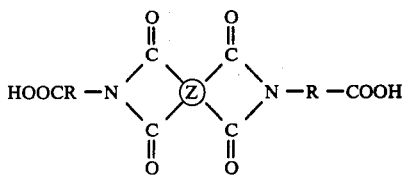

The tetracarboxylic includes for example pyromellitic dianhydride, butane tetracarboxylic dianhydride, naphthalene tetracarboxylic dianhydride, 3,3',4,4'-benzophenone tetracarboxylic dianhydride, 3,3',4,4'-diphenylsulfone-tetracarboxylic dianhydride, etc.

In the preferred embodiment, the dicarboxylic acid employed in preparing the resin is predominantly IDA, preferably those derived from TMA.

In addition to IDA, a wide variety of polycarboxylic acids, or esters thereof can be employed in the preparation of the polyesters of this invention. In general, these include the polycarboxylic acids conventionally employed in the preparation of polyesters. These acids may possess two, three, four or more carboxyl groups, may be aliphatic, alicyclic, heterocyclic, aromatic, etc., and may be saturated or unsaturated. Examples of such acids include the alkanedicarboxylic acid, for example those of the formula

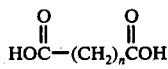

where $n=1$–10 or more such as malonic, succinic, glutaric, adipic, pimelic, suberic, azelaic, sebacic, etc., acids, isomers thereof where the alkylene group is branched and/or one or more of the carboxyl groups is not terminal; substituted alkanedicarboxylic acids such as chloro-succinic, etc.; alicyclic dicarboxylic acids, such as cyclohexanedicarboxylic acid, etc.; aromatic acids such as phthalic, isophthalic, terephthalic, diphenic, hemimellitic, trimellitic, 1,8-naphthalenic acid, pyromellitic acids, benzophenone dicarboxylic acid, dichlorophthalic acids; unsaturated acids such as fumaric, maleic, muconic, citraconic, mesaconic, glutaconic, (cis and trans), aconitic (cis and trans), bromomaleic, etc.; hydroxyacids such as citric, maleic, tartaric, etc. acids; dimeric fatty acids such as dilinoleic acid, etc.; tris(2-carboxyethyl) isocyanurate; adducts or maleic acids with various unsaturated and/or conjugated hydrocarbons such as diisobutylene, butadiene, rosin, abietic acid, terpolene, cyclopentadiene, linoleic acid, etc.; diglycollic acid, ethylenebisdiglycollic acid, etc.

The preferred polycarboxylic acids are the dicarboxylic acids containing from 2 to 10 carbon atoms, such as succinic, glutaric, adipic, suberic, maleic, phthalic, isophthalic, terephthalic, and the like. Particularly preferred polycarboxylic acids are the aromatic dicarboxylic acids, containing from 6 to 10 carbon atoms wherein the two carboxyl groups are attached directly to the aromatic nucleus such as the phthalic acids, but most preferably isophthalic and terephthalic acids.

The glycols employed in preparing the resins can vary widely. In general, they are the glycols conventionally employed in preparing polyesters. Suitable examples include the following: alkylene glycols of the formula $HO(A)_nOH$ where $n$ is for example 1–10 or higher and A is alkylene; ethylene; propylene, butylene, etc., for example ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol, etc. Preferably, one employs an alkanediol of the general formula $HO(CH_2)_nOH$ where $n=2$–5 or isomers thereof. The preferred glycol is ethylene glycol. Some of the polyester, poly(ester-imides) and/or poly(esteramide-imides), etc., can be prepared from glycols only.

The polyols used in the preparation of the resins of this invention can vary widely and are those containing at least three esterifiable hydroxyl groups. In general, these are the polyhydric alcohol conventionally employed in preparing polyesters. Illustrative examples of such alcohols are glycerol, polyglycerol, pentaerythritol, mannitol, trimethylolpropane, trimethylolethane, 1,2,6-hexanetriol, polypentaerythritol, polyallyl alcohol, polymethallyl alcohol, tris(2-hydroxyethyl) isocyanurate (THEIC), polyols formed by the condensation of bisphenols with epichlorohydrin and the like.

Preferred polyhydric alcohols to be used in the preparation of these polyesters are the aliphatic alcohols possessing from 3 to 6 hydroxyl groups and containing from 3 to 14 carbon atoms, such as glycerol, pentaerythritol, mannitol, 1,4,6-octanetriol, 1,3,5-hexanetriol and 1,5,10-dodecanetriol. The preferred polyol is THEIC.

It should be understood that mixtures of more than one polycarboxylic acid, more than one glycol and more than one polyol can be employed.

In the present invention, an isocyanurate polyol of the THEIC type is preferably employed.

Isocyanurate polyols are known which are polyfunctional derivatives of isocyanuric acid containing a plurality of — alkyl OH groups, where the alkyl group is straight chain or branched and where the alkyl has for example 1–10 or more carbons, such as 2–4 carbons, but preferably 2 carbons, for example compounds of the formula:

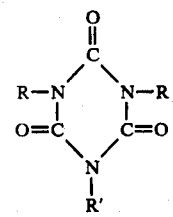

where R is — alkyl OH and R' is hyrogen or a substituted group, such as a hydrocarbon group, for example alkyl, aryl, cycloalkyl, etc., e.g. methyl, ethyl, propyl, butyl, etc., phenyl, cyclohexyl, etc., but preferably compounds of the formula where R' is R:

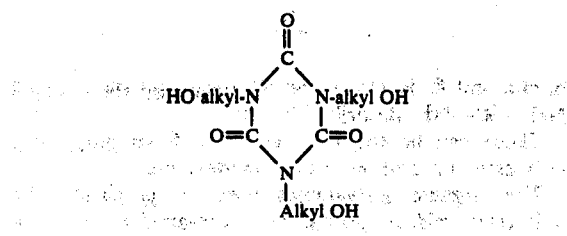

These isocyanuric derivatives are conveniently prepared as follows:

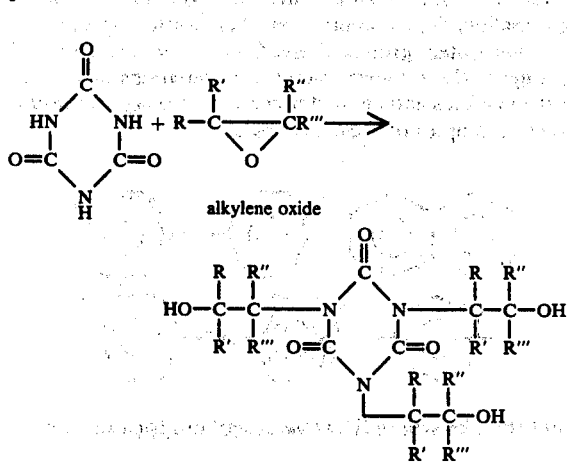

where the R's are preferably hydrogen or an alkyl group, for example where the alkylene oxide is ethylene, propylene, butylene, octylene, etc., oxides.

In addition to polyester resins prepared from IDA, IDA can also be employed in preparing poly(ester-amide) resins, poly(ester-imide) resins, poly(ester-amide-imide), etc. resins. For example, when tetracarboxylic acids are reacted with a polyamine there are formed polymers of the formula:

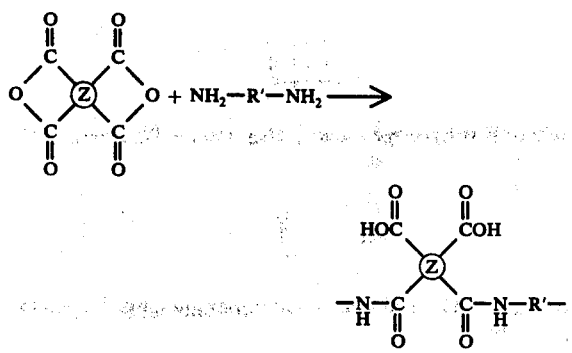

which react further at higher temperatures to form polyimides, for example

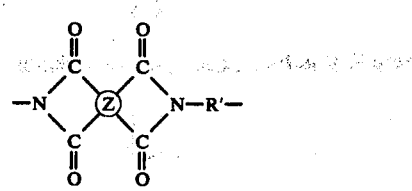

IDA are employed in these resins.

Similarly when tricarboxylic acids react with polyamines, poly(imide-amides) are formed, for example

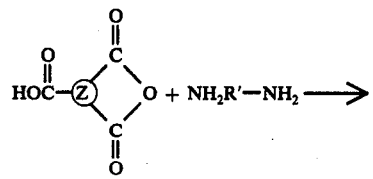

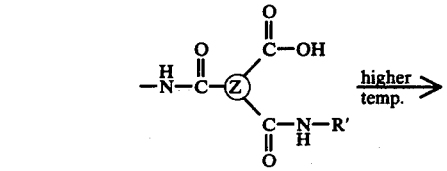

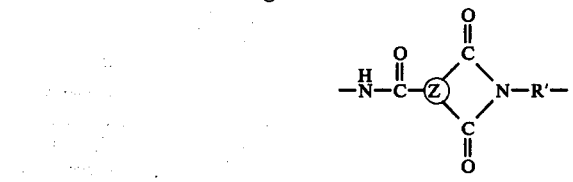

acrylic; and R' is the moiety of the polyamine, for example aliphatic, cycloaliphatic, arylic, etc., but preferably arylic. IDA are employed in these resins.

The tetracarboxylic acid dianhydrides useful in this invention are characterized by the following formula:

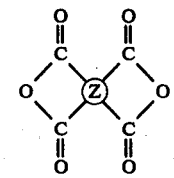

where Z is a tetravalent radical, e.g., aromatic, aliphatic, cycloaliphatic, combination of aromatic and aliphatic, or substituted group thereof. The preferred dianhydrides are those in which the Z groups have at least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical to provide a 5-membered ring as follows:

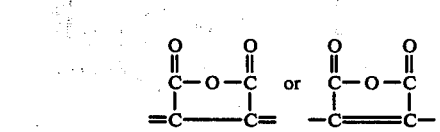

Illustration of dianhydrides suitable for use in the present invention include: pyromellitic dianhydride; 2,3,6,7-naphthalene tetracarboxylic dianhydride; 3,3',4,4'-diphenyl tetracarboxylic dianhydride; benzophenone tetracarboxylic dianhydride, 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; perylene 3,4,9,10-tetracarboxylic acid dianhydride; bis(3,4-dicarboxyphenyl) ether dianhydride; bis(3,4-dicarboxyphenyl) sulfone dianhydride and ethylene tetracarboxylic acid dianhydride.

Although trimellitic acid or its anhydride (TMA) is the preferred tricarboxylic acid, other suitable tricarboxylic acids or anhydrides can be employed, for example,

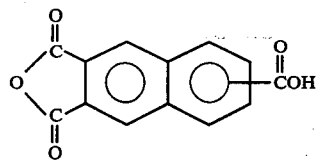

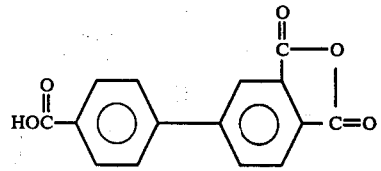

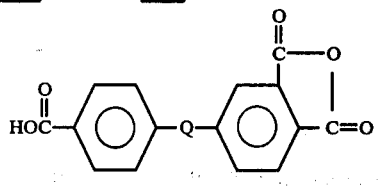

where Q is for example alkylene such as

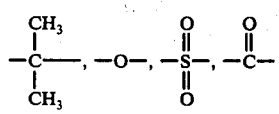

etc. Specific examples include
  trimellitic anhydride,
  3,4,4'-diphenylmethane-tricarboxylic anhydride,
  3,4,4'-diphenylether-tricarboxylic anhydride,
  3,4,4'-diphenylsulfone-tricarboxylic anhydride,
  3,4,4'-benzophenone-tricarboxylic anhydride,
  1,2,4-naphthalene-tricarboxylic anhydride,
  2,3,6-naphthalene-tricarboxylic anhydride,
  2,3,5-pyridine-tricarboxylic anhydride,
and functional derivatives thereof.

Trimellitic acid or anhydride can be pre-reacted with various reactants and these products later reacted to form polyesters, poly(ester-amides), poly(ester-imides), etc. For example

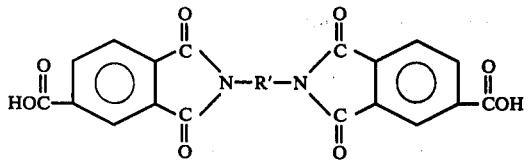

where R' is a group derived from a diamine for example any of the diamines NH$_2$—R'—NH$_2$ described herein.

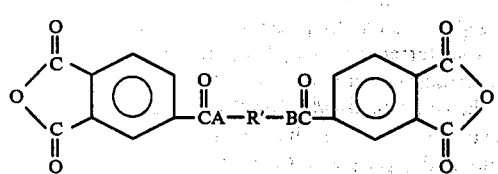

such as described in U.S. Pat. No. 3,182,073, where A and B are 0;

S, etc. and R' is any of the R' groups on the diamine NH$_2$—R'—NH$_2$ described herein.

These can be further reacted to form polyesters, poly(ester-amides), poly(ester-imides), etc.

The organic polyamines used in preparing the poly(ester-imides), poly(ester-imides-amides), etc., include those having the structural formula H$_2$N—R'—NH$_2$, wherein R', a divalent radical containing at least two carbon atoms, may be aromatic, aliphatic, cycloaliphatic, a combination of aromatic and aliphatic or substituted groups thereof, etc. The preferred R' groups in these diamines are those containing at least six carbon atoms and characterized by benzenoid unsaturation. Examples of these groups are:

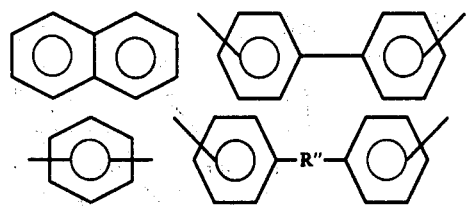

and the like where R" is hydrocarbon, for example,

where R is hydrogen, alkyl, etc.; amino, for example

where R is hydrogen alkyl, etc.; amido,

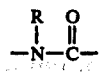

where R is hydrogen, alkyl, etc.; azo-, —N≠N—; ester,

oxygen, —O—; silicon or silicon-containing, for example —Si—,

where R is hydrogen, alkyl, etc.; ketone,

phosphorus or phosphorus-containing, for example —P—,

where R is hydrogen, alkyl, etc.,

sulfur, —S—,

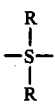

where R is hydrogen, alkyl, etc.; sulfone,

sulfoxide,

etc.

These aromatic groups may also be substituted, for example, as follows:

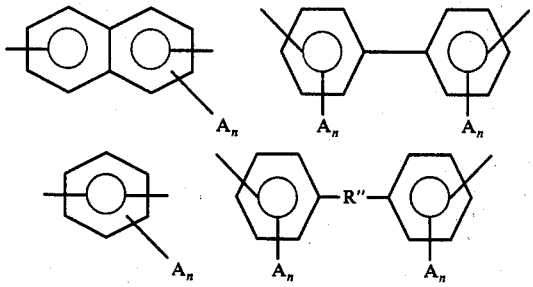

where A is a substituted group for example alkyl, alkoxy, halo, nitro, etc. and n is a number for example 0–4 inclusive.

Among the diamines which are suitable for use in the present invention are:
4,4'-diamine-diphenyl propane;
4,4'-diamino-diphenyl methane;
benzidine;
3,3'-dichloro-benzidine;
4,4'-diamino-diphenyl sulfide;
3,3'-diamino-diphenyl sulfone;
4,4'-diamino-diphenyl-sulfone;
4,4'-diamino-diphenyl ether;
1,5-diamino-naphthalene;
meta-phenylene-diamine;
para-phenylene-diamine;
3,3'-dimethyl-4,4'-biphenyl diamine;
3,3'-dimethoxy benzidine;
bis-(beta-amino-t-butyl) toluene;
bis(para-beta-amino-t-butyl-phenyl) ether;
bis(para-beta-methyl-delta-amino-pentyl) benzene;
bis-para-(1,1-dimethyl-5-amino-pentyl) benzene;
1-isopropyl-2,4-meta-phenylene diamine;
m-xylylene diamine;
p-xylylene diamine;
di(para-amino-cyclohexyl) methane;
hexamethylene diamine;
heptamethylene diamine;
octamethylene diamine;
nonamethylene diamine;
decamethylene diamine;
diamino-propyl tetramethylene diamine;
3-methylheptamethylene diamine;
4,4-dimethylheptamethylene diamine;
2,11-diaminododecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylenediamine;
3-methyl-heptamethylene diamine;
5-methylnonamethylenediamine;
2,11-diamino-dodecane;
2,17-diamino-eicosadecane;
1,4-diaminocyclohexane;
1,10-diamino-1,10-dimethyl decane;
1,12-diamino-octadecane;
$H_2N(CH_2)_3O(CH_2)_2NH_2$;
$H_2N(CH_2)_3S(CH_2)_3NH_2$;
$H_2N(CH_2)_3N(CH_3)(CH_2)_3NH_2$;
piperazine.

A plurality of the above polyamines can also be employed for example 2, 3, 4 or more of these amines, in preparing the resin.

The following examples are presented for purposes of illustration and not of limitation.

In the following examples a Non-IDA example (the A example) was prepared and compared to a corresponding example (the B example) where IDA was substituted for the dicarboxylic acid. In general, in the B example the IDA is first prepared by reacting the polycarboxylic acid such as TMA with the aminoacid until the theoretical amount of water (95–100%) is removed to form the IDA.

After forming the IDA and reaction temperature is lowered, the remaining ingredients of the B examples are added and the reaction continued in the manner of the A example to the desired viscosity.

The reaction is carried out in a reaction vessel equipped with a condenser.

The solvent employed in the A and B examples is cresylic acid at about 70–75% solids. The final product is diluted with cresylic-aromatic solvent to about 30% solids.

EXAMPLE 1

Polyester

| 1A | | 1B |
|---|---|---|
| Equivalents | | Equivalents |
| 20.0 | Ethyleneglycol (EG) | 20.0 |
| 40.0 | THEIC | 40.0 |
| 40.0 | DMT | — |
| — | TMA | 40.0 |
| — | Glycine | 40.0 |

Example 1A illustrates the preparation of a conventional polyester. Example 1B illustrates the preparation of the Polyester of the present invention where the TMA-Glycine derived IDA is substituted for DMT.

|  | 1A | 1B |
| --- | --- | --- |
| Reaction Temperature | 420–430 | 390–410 |
| Processing |  |  |
| Final Viscosity | Z5–Z6 | Z4–Z5 |
| in cresylic acid | (37%) | (30%) |

EXAMPLE 2

Poly(ester-imide)

| 2A |  | 2B |
| --- | --- | --- |
| Equivalents |  | Equivalents |
| 18.0 | EG | 18.0 |
| 25.0 | THEIC | 25.0 |
| 32.0 | TMA | 32.0 |
| 16.0 | MDA | 16.0 |
| 9.0 | DMT | — |
| — | TMA | 9.0 |
| — | Glycine | 9.0 |

Example 2A illustrates the preparation of a conventional Poly(ester-imide). Example 2B illustrates the preparation of the Poly(ester-imide) of the present invention.

|  | 2A | 2B |
| --- | --- | --- |
| Reaction Temperature ° F | 420–430 | 380–390 |
| Processing |  |  |
| Final Viscosity | Z2–Z3 | Z4–Z5 |
| in cresylic acid | (30%) | (30%) |

EXAMPLE 2'

The following is another illustration of a Poly(ester-imide)

| 2'A |  | 2'B |
| --- | --- | --- |
| Equivalents |  | Equivalents |
| 51.0 | EG | 51.0 |
| 26.0 | TMA | 26.0 |
| 13.0 | MDA | 13.0 |
| 10.0 | DMT | — |
| — | TMA | 10.0 |
| — | Glycine | 10.0 |

Example 2'A illustrates the preparation of a conventional Poly(ester-imide). Example 2'B illustrates the preparation of the Poly(ester-imide) of the present invention.

|  | 2'A | 2'B |
| --- | --- | --- |
| Reaction Temperature ° F | 420–430 | 380–390 |
| Processing |  |  |
| Final Viscosity | Z2–Z3 | Z4–Z5 |
| in cresylic acid | (30%) | (30%) |

EXAMPLE 3

Poly(Ester-Imide-Amide)

| 3A |  | 3B |
| --- | --- | --- |
| Equivalents |  | Equivalents |
| 18.0 | EG | 18.0 |
| 25.0 | THEIC | 25.0 |
| 30.0 | TMA | 30.0 |
| 18.0 | MDA | 18.0 |
| 9.0 | MDT | — |
| — | TMA | 9.0 |
| — | Glycinne | 9.0 |

Example 3A illustrates the preparation of a conventional Poly(ester-imide-amide). Ex. 3B illustrates the preparation of the Poly(ester-imide-amide) of the present invention

|  | 3A | 3B |
| --- | --- | --- |
| Reaction Temperature ° F | 420–430 | 390–410 |
| Processing |  |  |
| Final Viscosity | Z2–Z3 | Z4–Z5 |
| in cresylic acid | (30%) | (30%) |

When resins of the present invention are to be employed as magnet wire enamels, the resins are applied to the wires from solution by well-known methods. For optimum results we have found that solutions containing from about 20 to 50 percent resin solids should be employed. These solutions can be prepared by diluting higher concentration resin solutions with any of the resin solvents mentioned above.

The method of applying the resin to wire comprises passing the wire through the resin solution, through a suitable die, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution. Although the die sizes are not critical, I prefer to employ dies which provide a clearance of from 2 to 4 mils around the wire. The speed at which the wire is passed through the resin solution and the temperature at which the oven is maintained depend on the particular resin solution employed, the build of enamel desired, the length of the oven in which the coated wire is cured, and the molecular weight of the resin used in the coating operation. I have found that an enamel build on a 40.3 mil or 18 wire round copper wire of about 3 mils (diameter of enameled wire less diameter of bare wire) may be obtained by passing the wire through a solution containing 25–35%, by weight, of a suitable resin and through a heating tower 18 feet long at speeds of from about 15 to 100 feet per minute when the temperature of the curing oven is maintained at from about 600° to 1000° F. In general, the higher the wire speed, the higher is the optimum wire curing tower temperature. In the coating operation just described, the wire is generally passed through the resin solution and a wire tower six times to obtain the desired build. In addition, the wire can be coated by dip application, groove rolls, etc.

In order to insure complete curing of the resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be the soluble salts of Zn, Pb, Ti, Cd, Co, Th, Zi, Sn, Pd, Mn, Sb, Ge, Ce, etc., for example zinc octoate, cadmium octoate, copper naphthenate, tetraisopropyl titanate, tetrabutyl titanate, etc., aromatic polyisocyanates, aliphatic polyisocyanates, etc. Examples of polyisocyanates are those disclosed in U.S. Pat. No. 3,211,585 including the blocked isocyanates which are by reference incorporated herein as if part hereof. Where metal-containing curing catalysts are employed we have obtained satisfactory results using from about 0.05 to 4.0 or more percent, by weight, of the metal element of the catalyst based on the total resin solids. Preferably, one uses sufficient metal-containing catalyst to give about 0.1–2.0 percent metal based on the total resin solids and when using the polyisocyanates we use about 2–15%, preferably 4–10%, by weight, of the isocyanate based on the total resin solids present. Where other cross-linking resins are employed for example triazine resins such as melamine-aldehyde resins, phenol-aldehyde resins, etc. or modified derivatives thereof, one employs 1–10%, such as 1.5–8% but preferably 2–4% based on total solids.

The properties of the resin can be improved by the addition of a polyisocyanate in an amount of 1–20%, preferably 2–10% by weight of the total of the polyisocyanate and resin. Preferably, the polyisocyanate has at least three available isocyanate groups.

Among the polyisocyanates which can be employed there may be mentioned diisocyanates such as 2,4-tolylene diisocyanate, 2,6-tolylene diisocyanates, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, diansidine diisocyanate, 4,4'-diphenyl ether diisocyanate, 4,4-4"-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

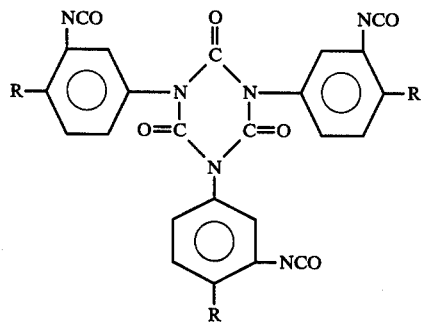

where R is a lower alkyl radical, e.g., n-butyl, tetriary butyl, secondary butyl, isopropyl, methyl, ethyl, etc., 1,3,5-triisocyanate benzene, 2,4,6-triisocyanate toluene, 4,4'-dimethyldiphenylmethane, 2,2',5,5'-tetraisocyanate, 2,4,4'-triisocyanate diphenylmethane, 2,4,6-triisocyanate diphenyl ether, 2,2',4-triisocyanate diphenyl sulfide, 2,4,4'-triisocyanate diphenyl sulfide, 2,3',4-triisocyanate-4'-methyl diphenyl ether, 2,3',4-triisocyanate-4'-methoxydiphenyl ether, 2,4,4'-triisocyanate-3'-chlorodiphenyl ether, 2,4,4'-triisocyanate-3',5-dimethyl diphenyl ether, 4,4',6-diphenyl triisocyanate, 1,2,4-butanetriol triisocyanate, 1,3,3-pentane triisocyanate, 1,2,2-butane triisocyanate, phloroglucinol triisocyanate, the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene dissocyanate with 1 mol of trimethylol ethane and, in general, the reaction product of a dissocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g. by forming carbamates therewith, are monohydric phenols, such as phenol, meta-cresol, para-cresol, orthocresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro-phenol, 4-nitro phenol, 3-nitro-phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkylcarbamic acid aryl esters, e.g. hydroxyethylcarbamic acid phenyl ester, hydroxyethylcarbamic acid cresyl ester, diethyl malonic, mercaptans, e.g., 2-mercaptobenzothiazole, 2-mercaptothiazoline, dodecyl mercaptan, ethyl 2-mercaptothiazole, p-naphthyl mercaptan, a-naphthyl mercaptan, methyl mercaptan, butyl mercaptan, lactams, e.g., ε-caprolactam, Δ-valerolactam, γ-butyrolactam, β-propiolactam, imides, e.g., succinimide, phthalimide, naphthalimide, glutarimide, dimethylphenyl carbinol, secondary amines, e.g., o-ditolylamine, m-ditolylamine, p-ditolylamine, N-phenyl toluidine, phenyl-a-naphthylamine, carbazole, diphenylamine, etc., mono-a-phenylethyl phenol, di-a-phenylethyl phenol, tri-a-phenylethyl phenol, carvacrol, thymol, methyl diphenyl carbinol, triphenyl carbinol, 1-nitro tertiary butyl carbinol, 1-chlorotertiary butyl carbinol, triphenyl silanol, 2,2'-dinitrodiphenyl-amine, 2,2'-dichlorodiphenylamine, ethyl n-butyl malonate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur SH, wherein the isocyanate groups of the reaction product of 3 mols of mixed 2,4- and 2,6-tolylene diisocyanate with trimethylol propane are blocked by esterification with m-cresol. At present Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or aceto-acetic acid ester or phenol or cresylic acid or ε-caprolactam or 2-mercaptobenzothiazole or succinimide or phthalimide or diphenyl amine or phenyl-β-naphthyl amine, triphenyl methane triisocyanate having the isocyanate groups blocked with phenol or mixed cresols or tertiary butyl alcohol of phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

Where the resins of this invention are to be employed as slot insulation in dynamoelectric machines, it is necessary to form cured sheets or films of the resin. This can be accomplished by any of the conventional film-forming methods such as casting a solution of resin and heating the casting to drive off the solvent and curing the resin. Films can also be formed by extruding viscous solutions of the resins into a heated chamber where curing takes place. Film formed from these resins are tough, flexible products having high dielectric strength, thermal stability and high tensile strength. These films may be used as slot insulation on dynamoelectric machines by lining the slots in armatures with the film and placing the insulated windings into the lined slots.

| 1.85 Parts | Mondur SH |
| 4.45 parts | Phenol-formaldehyde Resin (40% solids) |
| 0.90 parts | Tetra N-Butyl Titanate |
| 0.59 parts | Cobalt Napthenate (6% metal) |
| 0.20 parts | Cerium Naphthenate (6% metal) |

The wires were coated in the conventional manner to yield an enamel build on a 40.3 mil or 18 round copper wire of about 3 mils (diameter of enameled wire less diameter of bare wire). The results are presented in Table I.

Table I

| | Ex. | Wire Surface | Flex-ibility | Single Scrape (Emerson) | Cut Thru | Burn Out Seconds | Heat Shock at 200° C | Heat Shock at 180° C | Dielec-tric |
|---|---|---|---|---|---|---|---|---|---|
| 200 Type Polyester | 1A | Smooth | 2× ok | 24 lb | 390° C | 650 | Unstretched Surface Cracks | Unstretched 3× ok | 3000 V/M+ |
| 200 Type Polyester with IDA | 1B | Smooth | 2× ok | 30 lb | 400° C | 680 | Unstretched 3× ok | Unstretched 2× ok | 3000V/M+ |
| Poly(ester-imide) | 2A | Smooth | 1× ok | 22 lb | 380° C | 600 | 20% stretched 3× ok | — | 3000 V/M+ |
| Poly(ester-imide) | 2B | Smooth | 1× ok | 26 lb | 390° C | 625 | 20% stretched 3× ok | — | 3000 V/M+ |
| Poly(ester-amide-imide) | 3A | Smooth | 1× ok | 28 lb | 390° C | 650 | 20% stretched 3× ok | — | 3000 V/M+ |
| Poly(ester-amide-imide) with IDA | 3B | Smooth | 1× ok | 30 lb | 400° C | 670 | 20% stretched 2× ok | — | 3000 V/M+ |

These films can also be used as the dielectric material in capacitors and are particularly valuable for use in aluminum foil type capacitors.

In order to determine whether the insulation on a magnet wire will withstand mechanical, chemical, electrical and thermal stresses encountered in winding machines and electrical apparatus, it is customary to apply the resin to a conductor and to subject the enameled wire to a series of tests which have been designed to measure the various properties of the enamel on the wire.

The wire enamels were prepared in a conventional manner. The resins prepared herein were diluted with a mixed solvent to a resin content of 25-35% by weight. The mixed solvent has a weight ratio of 8:2 to 6:4 cresylic acid to aromatic solvent. The aromatic solvent contained various ratios of Solvesso 100 and Solvesso 150 and/or xylene toluene. Other solvents include halogenated coal tar solvents and solvents such as N-Methyl pyrrolidone, dimethyl sulfoxide, dimethylformamide and other similar solvents alone or in combination.

The resins of the present invention possess excellent mechanical, chemical, thermal and electrical properties. The desirable properties will depend on the particular application to which they are applied. Where the resins are employed as wire enamels, the desired properties will depend on the conditions under which the wire enamels are employed.

The resins of this invention yield wire enamels capable of operation at temperatures above 200° C. The commercial importance of such resins is so well recognized that they are known to the trade as "200 Type Wire Enamels."

The following wire coating enamel examples are presented for purposes of illustration and not of limitation.

All wire enamels were prepared by adding the curing agents to 100 parts by weight to the Resin at 30% solids as follows:

In contrast to the use of aliphatic aminocarboxylic acids such as glycine, etc. in the preparation of aliphatic IDA and in the preparation of resins therefrom, this invention also relates to the use of aromatic aminocarboxylic acids, for example aminobenzoic acids, such as ortho-, meta- and paraaminobenzoic acids, aminonaphthoic acid, 4-amino-4-carboxyl diphenyl ether, etc. in the preparation of aromatic IDA; and the use of aromatic IDA in the preparation of a wide variety of resins therefrom including polyesters, poly(ester-amides), poly(ester-imides), poly(ester-imide-amides), etc. In the preferred embodiments such resins contain tris-(hydroxyethyl) isocyanurate (THEIC). The IDA derived from trimellitic anhydride (TMA) and aminobenzoic acid has the following idealized formula of the preferred Aromatic IDA

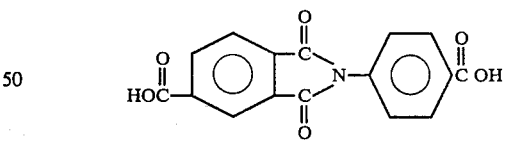

and is the predominant dicarboxylic acid employed in such resins. The above aromatic IDA can be performed prior to the preparation of the resin, or all reactants of the resin can be added approximately simultaneously and the IDA formed during the course of the reaction. Either way, IDA is the predominate dicarboxylic acid of the resin.

These aromatic IDA's can be employed instead of the amino aliphatic carboxylic acids in any resin described herein or it can be employed in conjunction with the aliphatic IDA's so that the predominant dicarboxylic acid comprises both aliphatic and aromatic IDA's.

In general, the resins of this invention are resins of
(A) a dicarboxylic acid component which is an iminodicarboxylic acid of the formula

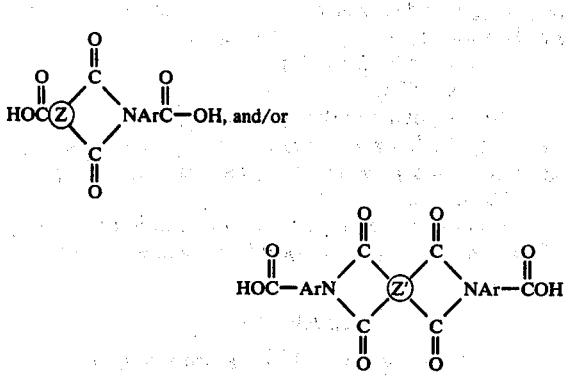

where Ⓩ and Ⓩ' are aromatic moieties, the indicated $$\overset{O}{\underset{}{\|}}\text{HOC—group}$$

attached to Ⓩ being attached to an aromatic ring of Ⓩ, the $$-\overset{O}{\underset{}{\|}}\text{C—groups}$$

linking an N to Z or Z' each being attached to an aromatic ring in Ⓩ or Ⓩ' and being present in a 5 membered imide ring, and the moiety Ar being aromatic, the N and COOH moieties attached to carbons of Ar, and of a polyhydric alcohol component which is at least one of (B) a glycol component, and (C) a polyol component containing at least three esterifiable hydroxyl groups, and any further components of said resin being (D) the imide or imide-amide of (D₁) an aromatic diamine and (D₂) an aromatic tricarboxylic or aromatic tetracarboxylic acid, of the formulae, respectively,

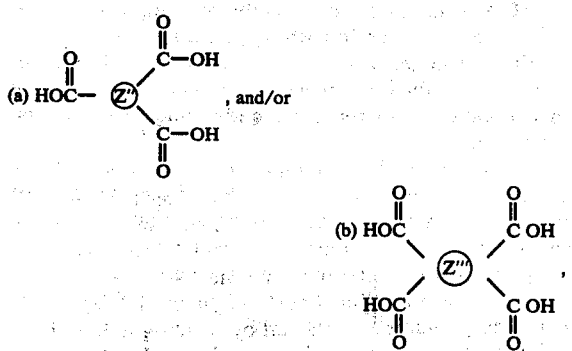

or anhydrides thereof, two of the COOH groups of the acid (a) and each of the COOH groups of each of the two pairs of such groups of the acid (b) being attached to adjacent carbons of a benzene ring of the Ⓩ" and Ⓩ'" moieties, respectively, Ⓩ" and Ⓩ'" being aromatic moieties;

where (A) and at least one of (B) and (C) and (D) are the sole polymer forming components of said resin and only the components (A) and at least one of (B) and (C) are required to be present as polymer forming components.

Preferably the aromatic iminodicarboxylic acid (aromatic IDA) component is of the formulae

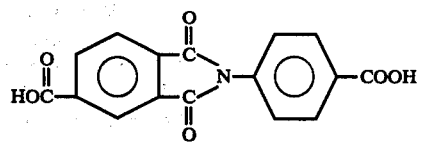

where Ar is an aryl group.

In one embodiment, the resin is a polyester of (A), (B) and (C), the components (D) being absent.

In another embodiment the resin is a poly(ester-imide) of components (A), (B), (C) and (D).

In the preferred embodiment, the polyol component (C) is tris(hydroxyethyl) isocyanurate (THEIC).

In the preferred embodiment, the component (A) is an aromatic IDA of the idealized formula

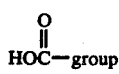

The ratio of the components for polyesters is as follows:

| Reactants | | Broad Range | Preferred Range | Optimum Range |
|---|---|---|---|---|
| A | TMA Molar Ratio 1/1 | 25–45 | 33–43 | 35–40 |
| | PABA | | | |
| B | Glycol | 0–25 | 5–15 | 8–13 |
| C | THEIC | 40–70 | 45–60 | 45–55 |

The preferred ratio of components for polyester-imides or polyester-amides-imides is as follows:

| Reactants | | Broad Range | Preferred Range | Optimum Range |
|---|---|---|---|---|
| A | TMA Molar Ratio 1/1 | 5–25 | 10–20 | 12–18 |
| | PABA | | | |
| B | Ethylene glycol | 5–25 | 10–20 | 12–18 |
| C | THEIC | 10–35 | 15–30 | 19–25 |
| D | TMA Molar Ratio 2/1 | 30–60 | 39–51 | 41–47 |
| | MDA | | | |

In preparing polyester-amide-imides the molar ratio of TMA to MDA can be varied to yield amido group in addition to imide groups.

In contrast to the use of aliphatic aminocarboxylic acids such as glycine, etc. in the preparation of aliphatic IDA and in the preparation of resins therefrom, this invention also relates to the use of aromatic aminocarboxylic acids, for example aminobenzoic acids, such as ortho-, meta- and para-aminobenzoic acids, aminonaphthoic acid, 4-amino-4-carboxyl diphenyl ether, etc. in the preparation of aromatic IDA; and the use of aromatic IDA in the preparation of a wide variety of resins therefrom including polyesters, poly(ester-amides), poly(ester-imides), poly(ester-imide-amides), etc. In the preferred embodiments such resins contain tris-(hydroxyethyl) isocyanurate (THEIC). The IDA derived from trimellitic anhydride (TMA) and aminobenzoic acid has the following idealized formula of the preferred Aromatic IDA

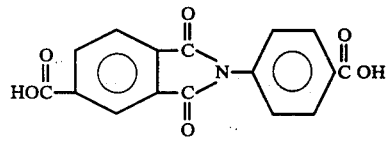

and is the predominant dicarboxylic acid employed in such resins. The above aromatic IDA can be preformed prior to the preparation of the resin, or all reactants of the resin can be added approximately simultaneously and the IDA formed during the course of the reaction. Either way, IDA is the predominate dicarboxylic acid of the resin.

These aromatic IDA's can be employed instead of the amino aliphatic carboxylic acids in any resin described herein or it can be employed in conjunction with the aliphatic IDA's so that the predominant dicarboxylic acid comprises both aliphatic and aromatic IDA's.

The following examples are presented for purposes of illustration and not of limitation.

All of the examples herein described can be modified so that aminobenzoic acid is employed in place of glycine to yield resins which are excellent wire enamels.

EXAMPLE 4

Aminobenzoic Acid Polyester

|  | Equivalents |
| --- | --- |
| Trimellitic anhydride | 27.8 |
| P-amino Benzoic Acid | 27.8 |
| Tris (Hydroxyl Ethyl) Isocyanurate | 34.3 |
| Ethylene Glycol | 10.1 |

All reactants were charged to the reactant vessel at one time and processed at 50% non-volatiles (N.V.) in cresylic acid using Tetrabutyl titanate as a catalyst. The amount of catalyst is ⅛% of the initial charge. The reaction mixture is heated slowly over 5 hours to 200° C., to a Z2 to Z2½ viscosity at 30% N.V. in Cresylic Acid. The resin was diluted to 30% N.V. in a combination of 60% Cresylic Acid and 40% aromatic solvent. Wire enamels were prepared as follows:

| Base Resin at 30% N.V. | 92.44 grams |
| --- | --- |
| Mondur SH | 1.70 grams |
| Phenolic Resin 42% N.V. | 4.12 grams |
| Tetrabutyl Titanate | 1.20 grams |
| 6% Cobalt Naphthenate | .54 grams |
|  | 100.00 grams |

The base resin was heated to 127° C, and Mondur SH added and mixed for ½ hour at 127° to 130° C, then cooled to 93° C. The Phenolic Resin was then added and cooled to 66° C; Tetrabutyl Titanate was then added and cooled to 52° C. Then cobalt naphthenate was added and mixed for 1 hour at 52° C. The final product has the following characteristics:

30% N.V. at 2 grams, 2 hours 200° C
570 cps at 25° C

Wires are coated in the conventional manner to yield an enamel build or a 40.3 mil on 18 round copper wire of about 3 mils. (diameter of enameled wire less diameter of base wire).

The following examples are processed in the manner of Example 4 to yield resins which yield excellent wire enamels.

EXAMPLE 5

Aminobenzoic Acid Poly (ester-imide)

| Reactants | Equivalents |
| --- | --- |
| EG | 16.4 |
| THEIC | 22.9 |
| TMA | 29.4 |
| MDA | 14.7 |
| TMA | 8.3 |
| PABA | 8.3 |
| 30% N.V. at 2 grams 2 hours 200° C. | |
| 700 cps at 25° C. | |

EXAMPLE 6

Aminobenzoic Acid Poly (ester-imide-amide)

| Reactants | Equivalents |
| --- | --- |
| EG | 16.4 |
| THEIC | 22.9 |
| TMA | 27.5 |
| MDA | 16.6 |
| TMA | 8.3 |
| PABA | 8.3 |
| 30% N.V. at 2 grams 2 hours 200° C. | |
| 150 cps at 25° C. | |

It should be understood that the IDA specified herein can be preformed by first reacting TMA with PABA before the other reactants are added, or all reactants can be added at approximately the same time and IDA formed during the course of the reaction. Either way the IDA structure is present in the resulting resin so that it is the predominant dicarboxylic acid.

Wires insulated with the wire enamels of this invention can be further improved by applying over the enamel layer an overcoat of a highly linear thermoplastic polymer.

The thickness of the outer layer of the linear polymer normally is preferably at least 10% of the thickness of the inner enamel layer but substantially thinner than the inner layer. Such an outer layer improves physical properties, particularly improving heat shock.

For the thermoplastic linear polymer of the outer layer, a polyester resin obtained by reacting a dihydric alcohol with an aromatic dicarboxylic acid is particularly suitable. Preferably, the linear polymer is a glycol-terephthalate polyester of the dominantly high molecular weight, such as polyethylene terephthalate known in the trade as "Dacron" or "Mylar." Examples of other such linear polyesters well adapted for this use are polycyclohexylene dimethyl terephthalate known in the trade as "Kodel" of the fiber-forming type, a polyethylene terephthalate known as "celanese Polyester Fortrel" (a product of Fiber Industries, Inc.), and a polyethylene terephthalateisoterephthlate product of Goodyear known as "Vicron." Also suitable for this purpose is a polyaromatic polycarboxylic aromatic imide known as Du Pont's M. L. polyamides for example those disclosed in U.S. Pat. No. 3,179,634 which has good thermal life, and, like the terephthalic base materials, can eliminate heat and solvent shock and meet the other requirements of a high temperature magnet wire. Other equivalent materials can be employed.

The linear thermoplastic polymer of the outer insulating layer of a wire made according to the invention acts as a rubber-like band of high tensile strength which, when the conductor is bent or stretched and heated, prevents heat shock in the underlying layer of enamel. Further, the greater toughness and insolubility of this outer layer greatly enhance the physical and chemical properties of the finished wire. Since highly linear polymers such as dihydric alcohol-terephthalate polyesters have excellent heat resistance, they do not detract from the overall thermal properties of the finished wire.

The outer layer of thermoplastic linear polymer should preferably be at least about 10% of the thickness of the inner layer of thermosetting non-linear polyesteramide. This is particularly so for round wire "Triple," sizes 8 through 40. For square and rectangular wire as well as round wire, "Single" and round wire "Heavy," the outer layer should constitute at least 13% of the total thickness or "build" of the combined inner and outer layers. On the other hand, the outer layer should be substantially thinner than the inner layer and preferably not greater than 25% of the inner layer thickness. Normally, the desired ratio of the two layers thicknesses can be obtained by applying from three to seven coats of the inner layer material and one or at least two coats of the outer layer material, each coat being applied by a wiping die and overcured in the conventional manner before application of the next coat.

OVERCOATED WIRE ENAMEL EXAMPLES

The wire enamels produced herein are overcoated with the following resins:
(1) Dacron.
(2) Kodel.
(3) Fortrel.
(4) Vicron.
(5) Nylon
(6) M-L polyimide polymers, for example

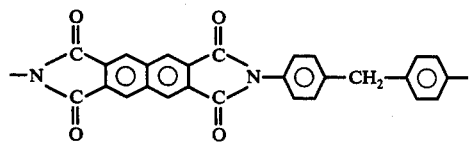

to produce a superior wire insulator having excellent heat shock.

(7) These wire enamels are also overcoated with the polyamide-imides of the U.S. Pat. No. 3,428,486 which is incorporated herein as part hereof. For example, the present wire enamels may be overcoated with the polyamide-imides of trimellitic anhydride and polyamines such as phenylene diamine. A suitable commercial overcoat is Amoco 1A Type 10, The P. D. George Co. "Tritherm," etc.

(8) One polyimide employed as an overcoat has the following polymeric unit:

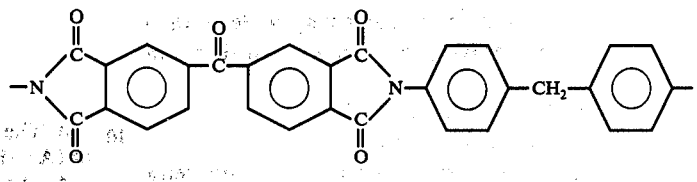

Although the utility of the resins of this invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates.

While representative embodiments of this invention have been presented, it will be apparent to those skilled in the art that various changes and modifications may be made without departing from the spirit and scope of the invention.

I claim:
1. A resin derived from
   (A) a dicarboxylic acid component which is an iminodicarboxylic acid of the formula

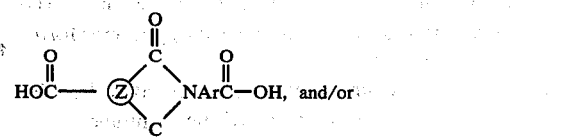

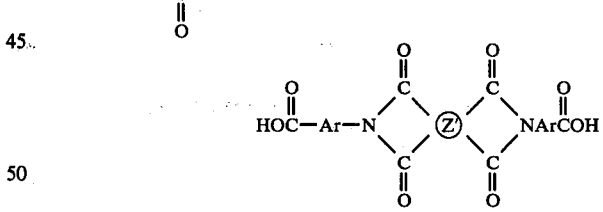

where $Z$ and $Z'$ are aromatic moieties, the indicated

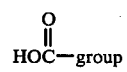
HOC—group attached to $Z$ being attached to an aromatic ring of $Z$, the

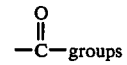
—C—groups linking an N to Z or Z' each being attached to an aromatic ring in $Z$ or $Z'$ and being present in a 5 membered imide ring and the moiety Ar being an aromatic ring, the N and COOH moieties being attached to the aromatic ring; and of a polyhydric alcohol component which is at least one of (B) a glycol component, and (C) a polyol component containing at least three esterifiable hydroxyl groups; and any further components of said resin being (D) the imide or imide-amide of
 (D₁) an aromatic diamine and
 (D₂) an aromatic tricarboxylic or aromatic tetra-carboxylic acid, of the formulae, respectively,

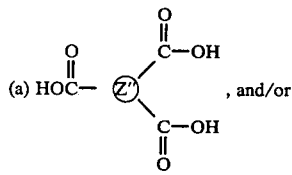

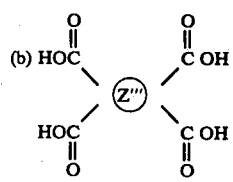

or the anhydrides thereof, two of the COOH groups of the acid (a) and each of the COOH groups of each of the two pairs of such groups of the acid (b) being attached to adjacent carbons of a benzene ring of the Z″ and Z‴ moieties, respectively, Z″ and Z‴ being aromatic moieties; where (A) and at least one of (B) and (C) and (D) are the sole polymer-forming components of said resin and only the components (A) and at least one of (B) and (C) are required to be present as polymer forming components.

2. The resin of claim 1 where the iminodicarboxylic acid component has at least one of the formulae

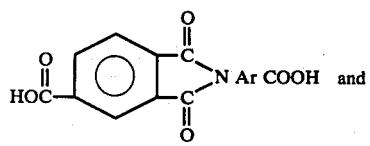

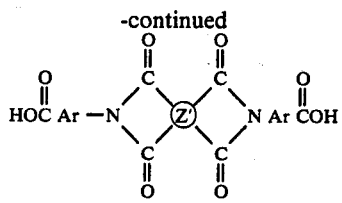

3. The resin of claim 2 where the resin is a polyester of (A), (B) and (C), the components (D) being absent.

4. The resin of claim 2 where the resin is a poly(ester-imide) of components (A), (B), (C) and (D).

5. The resin of claim 2 where the resin is a poly(ester-imide-amide) of components (A), (B), (C) and (D).

6. The resin of claim 3 in which the polyol component (C) is tris(hydroxyethyl) isocyanurate.

7. The resin of claim 4 in which the polyol component (C) is tris(hydroxyethyl) isocyanurate.

8. The resin of claim 5 in which the polyol component (C) is tris(hydroxyethyl) isocyanurate.

9. The resin of claim 6 where the component (A) is the iminodicarboxylic acid

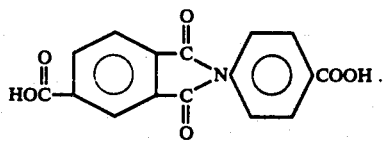

10. The resin of claim 7 where the component (A) is the iminodicarboxylic acid

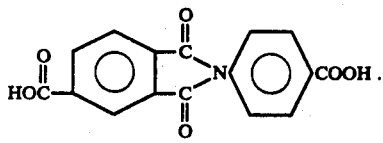

11. The resin of claim 8 where the component (A) is the iminodicarboxylic acid

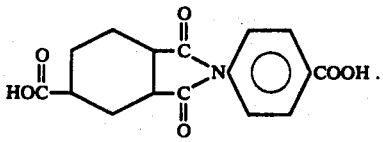

* * * * *